(12) United States Patent
Kikuchi (10) Patent No.: US 6,335,789 B1
(45) Date of Patent: Jan. 1, 2002

(54) OPTICAL RADAR SYSTEM (75) Inventor: Hayato Kikuchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/381,290

(22) PCT Filed: Oct. 15, 1998

(86) PCT No.: PCT/JP98/04670

§ 371 Date: Sep. 21, 1999

§ 102(e) Date: Sep. 21, 1999

(87) PCT Pub. No.: WO99/44074

PCT Pub. Date: Sep. 2, 1999

(30) Foreign Application Priority Data

Feb. 25, 1998 (JP) ............................................. 10-043908

(51) Int. Cl.[7] .......................... G01B 11/26; G01C 3/08; G02B 26/08; B60T 7/16
(52) U.S. Cl. ................ 356/141.1; 356/5.01; 356/141.5; 356/4.01; 356/5.1; 359/202; 180/169
(58) Field of Search ...................... 356/4.01, 5.01–5.15, 356/139.07–139.08, 141.1, 141.4, 141.5; 180/169; 250/203.2; 359/196–226

(56) References Cited

U.S. PATENT DOCUMENTS 3,602,572 A * 8/1971 Norris, Jr.
4,229,103 A * 10/1980 Hipp
4,477,184 A * 10/1984 Endo
4,627,734 A * 12/1986 Rioux ........................ 356/376
4,632,543 A * 12/1986 Endo

FOREIGN PATENT DOCUMENTS

| JP | 62-115389 | 5/1987 |
| JP | 5-42144 | 2/1993 |
| JP | 7-320199 | 12/1995 |
| JP | 8-313632 | 11/1996 |
| JP | 9-178856 | 7/1997 |

* cited by examiner

*Primary Examiner*—Stephen C. Buczinski
(74) *Attorney, Agent, or Firm*—Arent Fox Kintner Plotkin & Kahn, PLLC (57) ABSTRACT

A laser beam transmitted from a laser diode is run for scanning laterally as a transmitted-beam elongated vertically with a lateral width thereof limited. A wave of the transmitted-beam reflected from an object is caught in a beam receiving area which is elongated laterally with a vertical width limited and scanned vertically, and is received by a photo-diode. Even if the vertical width of the transmitted-beam is set at a sufficient large value to absorb an error in the vertical mounting of a radar system, the period of time when the direct sun rays enter the beam receiving area to make the detection impossible can be shortened by vertically scanning the beam receiving area elongated laterally. Thus, the influence of the direct sun rays can be maintained to the minimum to reliably detect the object without need for a precise aiming, excluding the case where the height position of the sun corresponds to the level of the object.

5 Claims, 11 Drawing Sheets

VERTICAL AND LATERAL SCANNING
BY TRANSMITTED-BEAM

FIG.11 PRIOR ART

OPTICAL RADAR SYSTEM

FIELD OF THE INVENTION

The present invention relates to a radar system for detecting an object by transmitting an electromagnetic wave comprising a laser beam or a millimeter wave toward the object and receiving a reflected wave thereof.

PRIOR ART

Figure 10A:
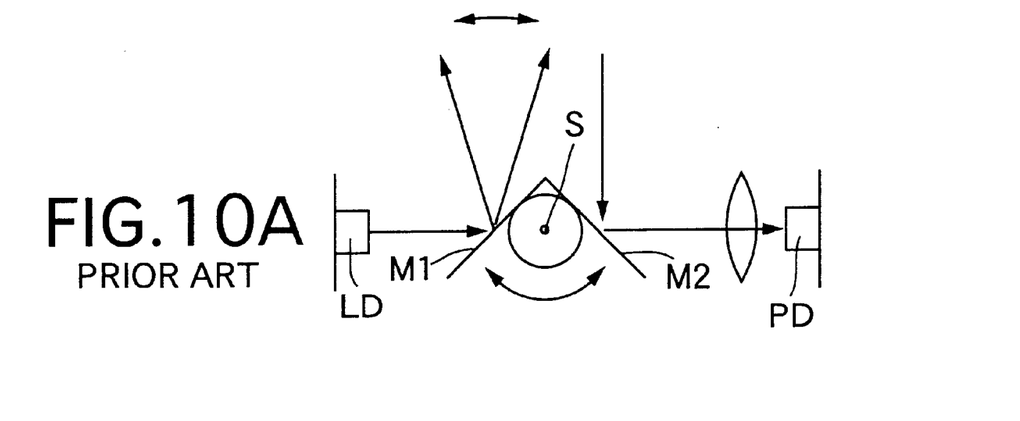
FIGS. 10A to 10C are diagrams for explaining prior art laser radar systems.
Figure 10B:
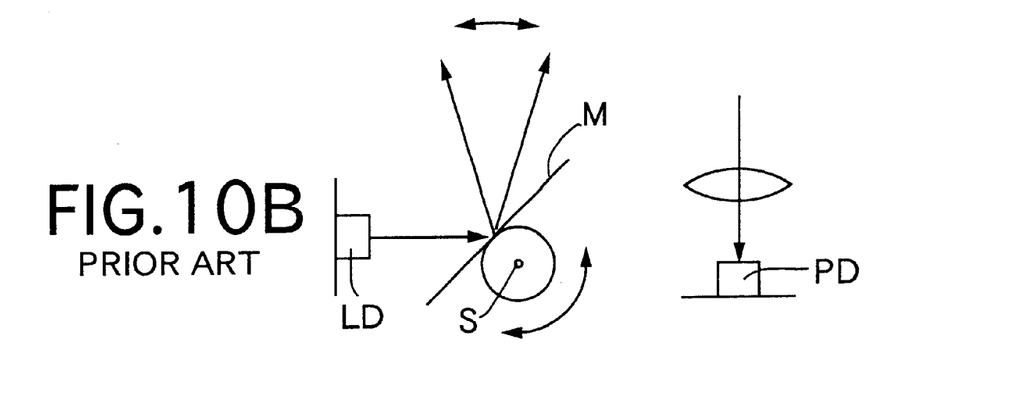
Figure 10C:
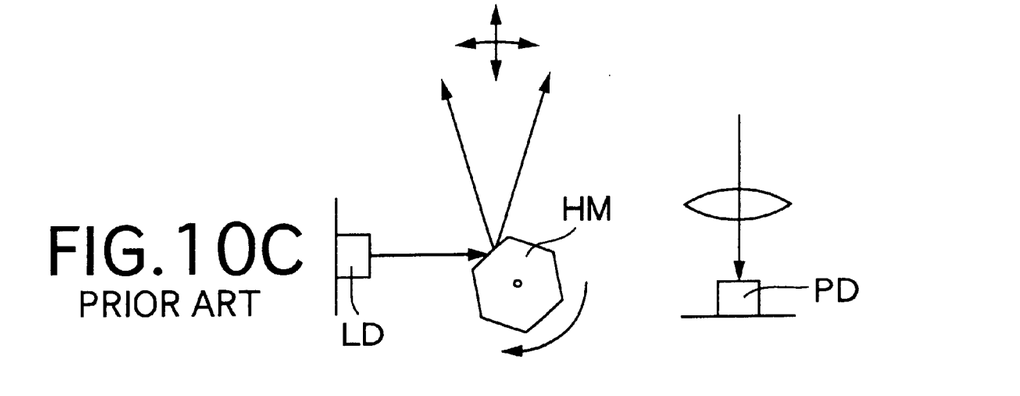

There are conventionally known laser radar systems mounted in a vehicle for detecting the position of a preceding vehicle traveling ahead of the vehicle and the distance between the vehicle and the preceding vehicle, which systems are shown in FIG. 10.

In the system shown in FIG. 10A, a laser beam emitted by a laser diode LD is reflected by a first mirror $M_1$ which is reciprocally turnable about a rotational axis S, and scans laterally as a transmitted-beam elongated vertically with its lateral width thereof limited. A beam receiving area elongated vertically with a limited lateral width is scanned laterally by a second mirror $M_2$ which is reciprocally turnable integrally with the first mirror $M_1$, and the wave reflected from an object is caught in the beam receiving area and received by a photo-diode PD.

In the system shown in FIG. 10B, a laser beam emitted from the laser diode LD is reflected by a mirror M reciprocally turnable about a rotational axis S, and scans laterally as a transmitted-beam elongated vertically with its lateral width limited. The wave reflected from an object is caught in a fixed beam receiving area and received by a photo-diode PD.

In the system shown in FIG. 10C, a laser beam emitted from a laser diode LD is reflected by a polyhedral mirror HM rotatable about a rotational axis S, and scans laterally and vertically as a transmitted-beam with lateral and vertical widths limited. The wave reflected from an object is caught in a fixed beam receiving area and received by a photo-diode PD.

Figure 11:
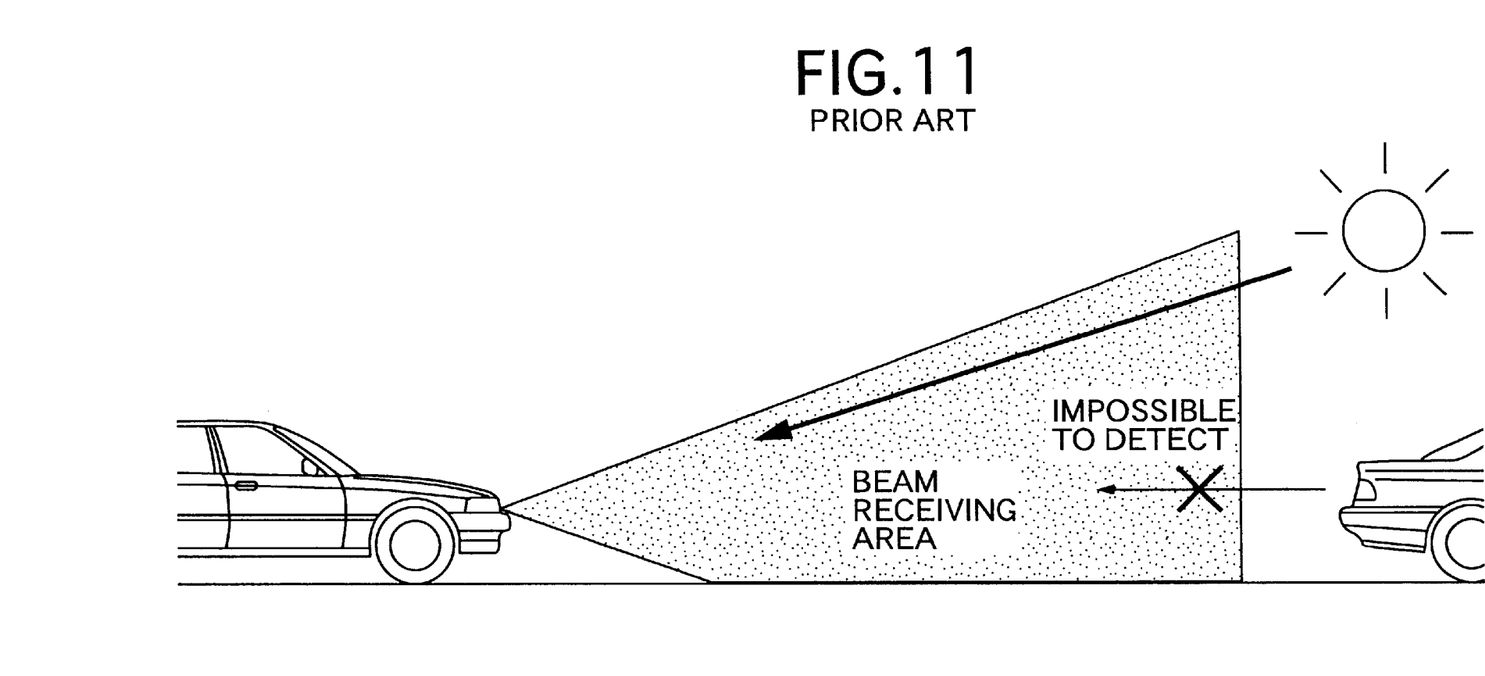
FIG. 11 is an illustration for explaining problems associated with the prior art examples.

Meanwhile, in the prior art systems shown in FIGS. 10A to 10C, the vertically elongated beam receiving area and the fixed beam receiving area are used. For this reason, as shown in FIG. 11, in some cases, the sun rays may enter the beam receiving area at such times of the day as in the morning or evening when the sun is low. As a result, there is the possibility that the amount of received-beam could be saturated due to the direct sun rays, thereby making it impossible to detect a preceding vehicle. If the vertical width of the beam receiving area is set at a small value in order to avoid this, there is the possibility that the preceding vehicle may go out of the beam receiving area, because of the aiming of the beam transmitted to the preceding vehicle being slightly displaced vertically, or because of the pitch angle of the vehicle being slightly varied due to the influence of a load carried on the vehicle, or due to the influence of the inclination of a road surface, thereby making it impossible to detect the preceding vehicle.

The present invention has been accomplished with the above circumstances in view, and it is an object of the present invention to provide a radar system, wherein the influence of the direct sun rays can be maintained to the minimum thereby to detect an object reliably, without need for a precise aiming.

DISCLOSURE OF THE INVENTION

To achieve the above object, according to the present invention, there is provided a radar system characterized by comprising an electromagnetic wave transmitting means for transmitting an electromagnetic wave, a first scanning means for laterally scanning with the electromagnetic wave transmitted from the electromagnetic wave transmitting means as a transmitted-beam elongated vertically with a lateral width thereof limited, a second scanning means for vertically scanning a receiving area elongated laterally with a vertical width thereof limited to catch the electromagnetic wave reflected from an object, and a reflected-wave receiving means for receiving the reflected wave caught in the receiving area.

With the above arrangement, the electromagnetic wave transmitted from the electromagnetic wave transmitting means scans laterally as a transmitted-beam elongated vertically with its lateral width limited by the first scanning means. The wave of the transmitted-beam reflected from the object is caught in the receiving area which is elongated laterally with the vertical width limited and scanned vertically by the second scanning means, and is received by the reflected-wave receiving means.

Even if the vertical width of the transmitted-beam is set at a sufficiently large value in order to absorb an error in the vertical mounting of the radar system to reliably detect the object, the object can be detected reliably, excluding the case where the height position of the sun corresponds to the level of the object, if the period of time when the direct sun rays enter the receiving area to make the detection impossible is shortened by vertically scanning the laterally elongated receiving area. Thus, the influence of the direct sun rays can be maintained to the minimum even at such times of the day as in the morning or evening when the sun is low, thereby enhancing the ability to detect the object.

In addition, according to the present invention, there is provided a radar system characterized by comprising an electromagnetic wave transmitting means for transmitting an electromagnetic wave, a first scanning means for vertically and laterally scanning with the electromagnetic wave transmitted from the electromagnetic wave transmitting means as a transmitted-beam having limited lateral and vertical widths thereof, a second scanning means for vertically scanning a receiving area elongated laterally with a vertical width thereof limited to catch the electromagnetic wave reflected from an object, and a reflected-wave receiving means for receiving the reflected wave caught in the receiving area, wherein a period of scanning by the second scanning means is equal to a period of vertical scanning by the first scanning means.

With the above arrangement, the electromagnetic wave transmitted from the electromagnetic wave transmitting means scans vertically and laterally as a transmitted-beam having the limited lateral and vertical widths by the first scanning means, and the wave of the transmitted-beam reflected from the object is caught in the receiving area which is elongated laterally with the vertical width limited and scanned vertically by the second scanning means, and is received by the reflected-wave receiving means. At this time, a period of vertical scanning by the second scanning means is equal to a period of vertical scanning by the first scanning means.

Even if the vertical width of vertical scanning of the transmitted-beam is set at a sufficiently large value in order to absorb the error in the vertical mounting of the radar system to reliably detect the object, the object can be detected reliably, excluding the case where the height position of the sun corresponds to the level of the object, if the period of time when the direct sun rays enter the receiving area to make the detection impossible is shortened by vertically scanning the laterally elongated receiving area. Thus, the influence of the direct sun rays can be maintained to the minimum even at such times of the day as in the morning or evening when the sun is low, thereby enhancing the ability to detect the object. Moreover, because the beam density can be increased by limiting the transmitted-beam in the vertical and lateral widths, even if the output of the electromagnetic wave transmitting means is decreased, a required beam density can be provided, and also the weather resistance such as at the time of rain or snow can be enhanced by increasing the beam density with the output of the electromagnetic wave transmitting means maintained intact.

BEST MODE FOR CARRYING OUT THE INVENTION

A mode for carrying out the present invention will now be described by way of embodiments of the present invention shown in the accompanying drawings.

FIGS. 1 to 5 show a first embodiment of the present invention.

Figure 1:
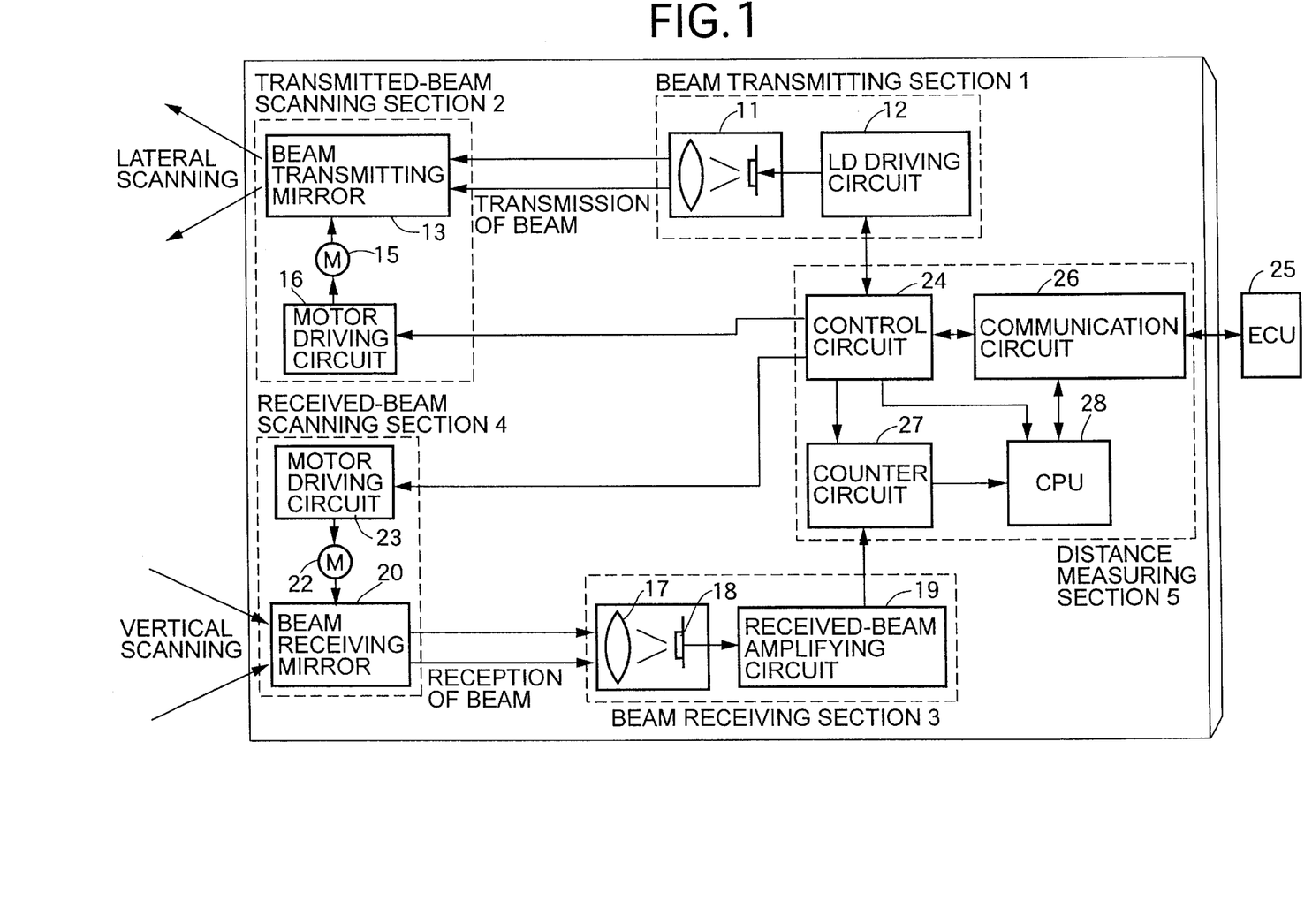
FIG. 1 is a block diagram of a laser radar system.
Figure 2:
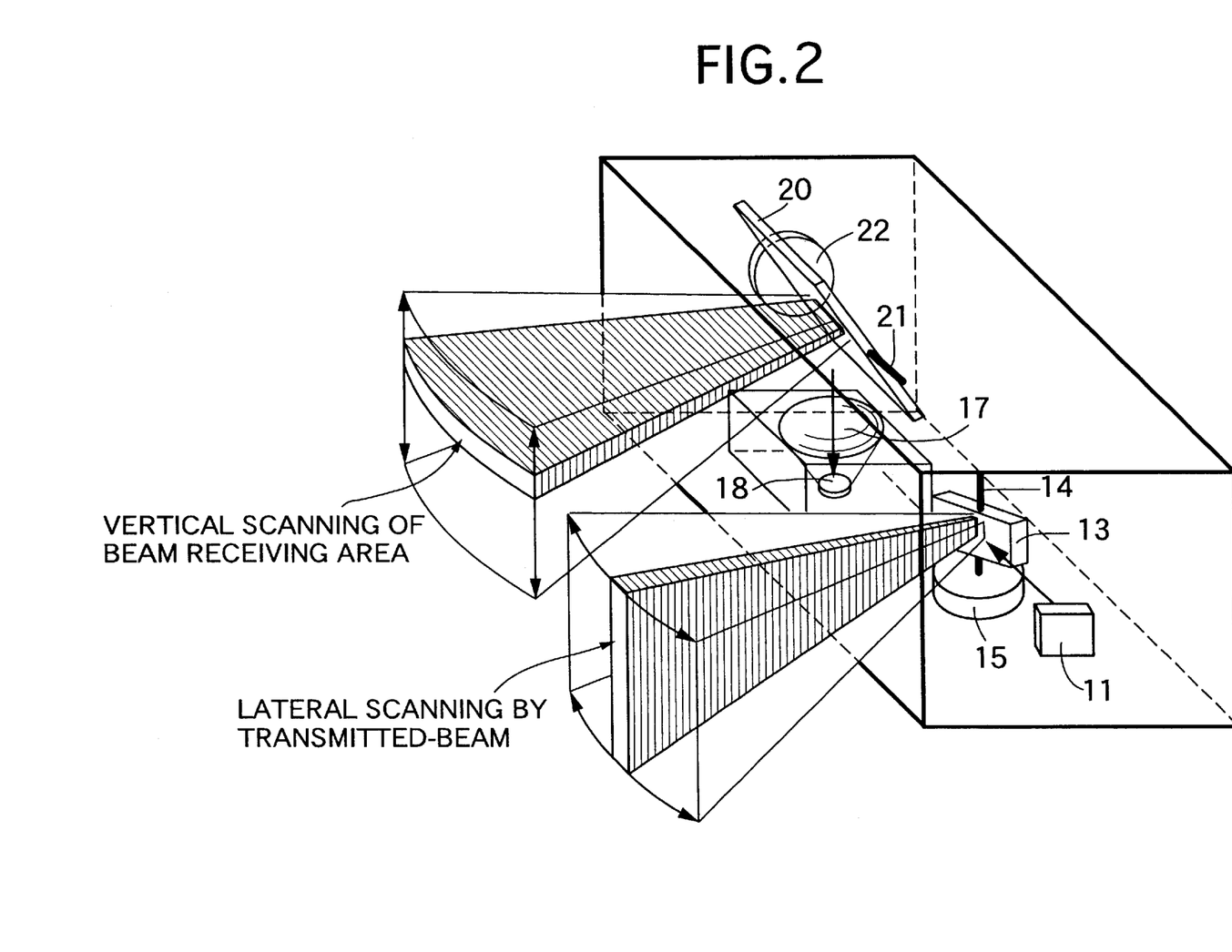
FIG. 2 is a perspective view of the laser radar system.

As shown in FIGS. 1 and 2, a laser radar system for detecting a distance between a vehicle and a preceding vehicle is comprised of a beam transmitting section 1, a transmitted-beam scanning section 2, a beam receiving section 3, a received-beam scanning section 4, and a distance measuring section 5. The beam transmitting section 1 includes a laser diode 11 integrally provided with a beam transmitting lens, and a laser diode driving circuit 12 for driving the laser diode 11. The transmitted-beam scanning section 2 includes a beam transmitting mirror 13 for reflecting laser beam output from the laser diode 11, a motor 15 for reciprocally turning the beam transmitting mirror 13 about a vertical axis 14, and a motor driving circuit 16 for controlling the driving of the motor 15. The transmitted-beam delivered from the beam transmitting mirror 13 has a vertically elongated pattern with a lateral width thereof limited, and is run for scanning laterally at a period of 40 msec. The lateral and vertical widths of the transmitted-beam are set at 1° and 10°, respectively, and the laterally scanning width is set at 16°.

The beam receiving section 3 includes a beam receiving lens 17, a photo-diode 18 for converting the reflected wave converged by the beam receiving lens 17 into an electric signal, and a received-beam amplifying circuit 19 for amplifying the signal output from the photo-diode 18. The received-beam scanning section 4 includes a beam receiving mirror 20 for reflecting the wave reflected from an object to feed it to the photo-diode 18, a motor 22 for reciprocally turning the beam receiving mirror 20 about a lateral axis 21, and a motor driving circuit 23 for controlling the driving of the motor 22. A beam receiving area scanned vertically at a period of 200 msec by the beam receiving mirror 20 has a laterally elongated pattern with a vertical width thereof limited. The vertical and lateral widths of the beam receiving area are set at 2° and 16°, respectively, and the vertically scanning width is set at 10°.

The distance measuring section 5 includes a control circuit 24 for controlling the laser diode driving circuit 12 and the motor driving circuits 16 and 23, a communication circuit 26 for conducting a communication between an electronic control unit 25 for controlling a cruise control system and an automatic brake device, a counter circuit 27 for counting the time taken from the transmission of the laser beam to the reception of the laser beam, and a central processing unit 28 for calculating a distance to an object, based on the time taken from the transmission of the laser beam to the reception of the laser beam.

The beam transmitting section 1, the transmitted-beam scanning section 2, the beam receiving section 3 and received-beam scanning section 4 correspond to an electromagnetic wave transmitting means, a first scanning means, a reflected-beam receiving means and a second scanning means as set forth in claim 1 of the present invention, respectively.

Figure 3:
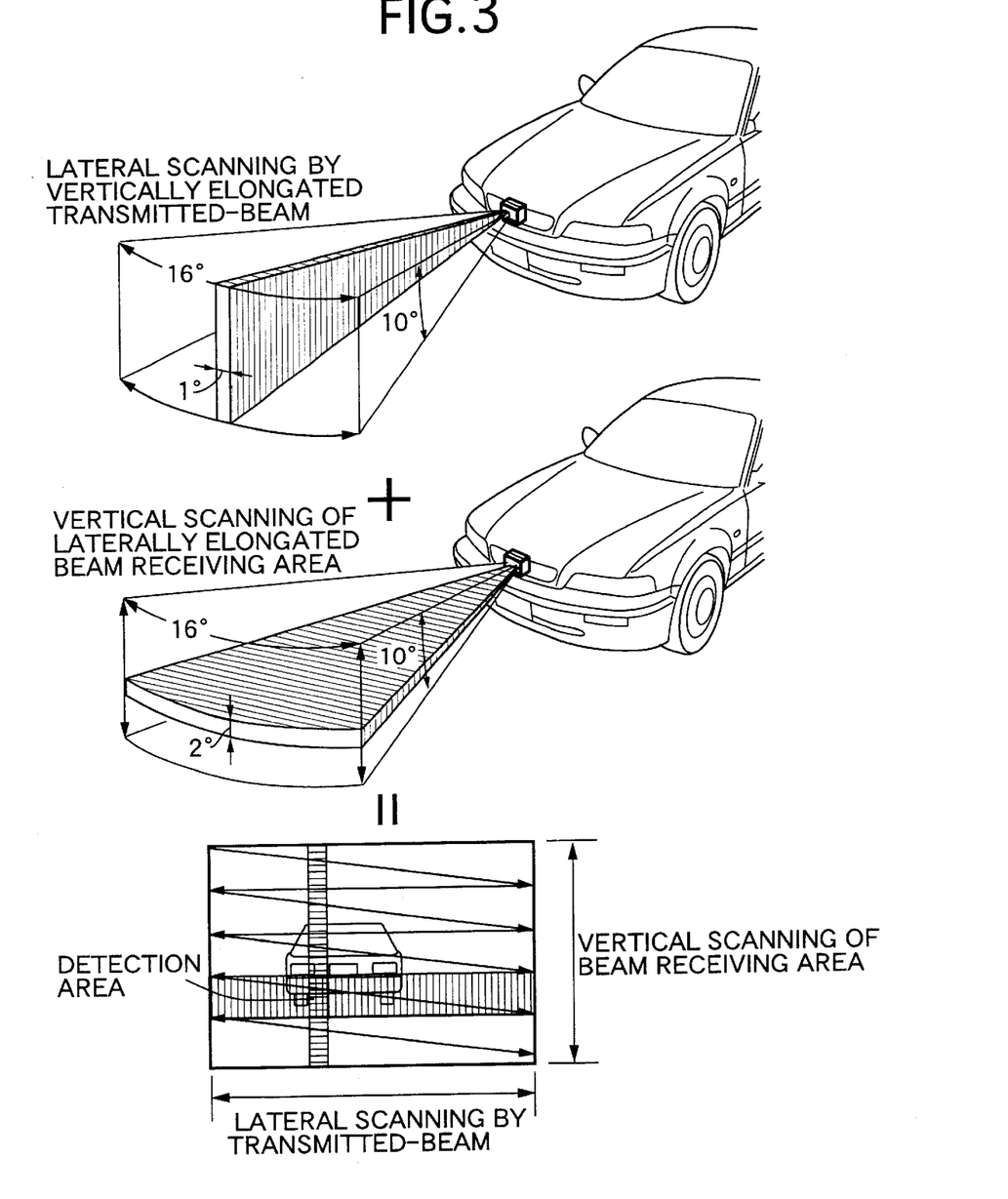
FIG. 3 is an illustration for explaining a scanning way.
Figure 4:
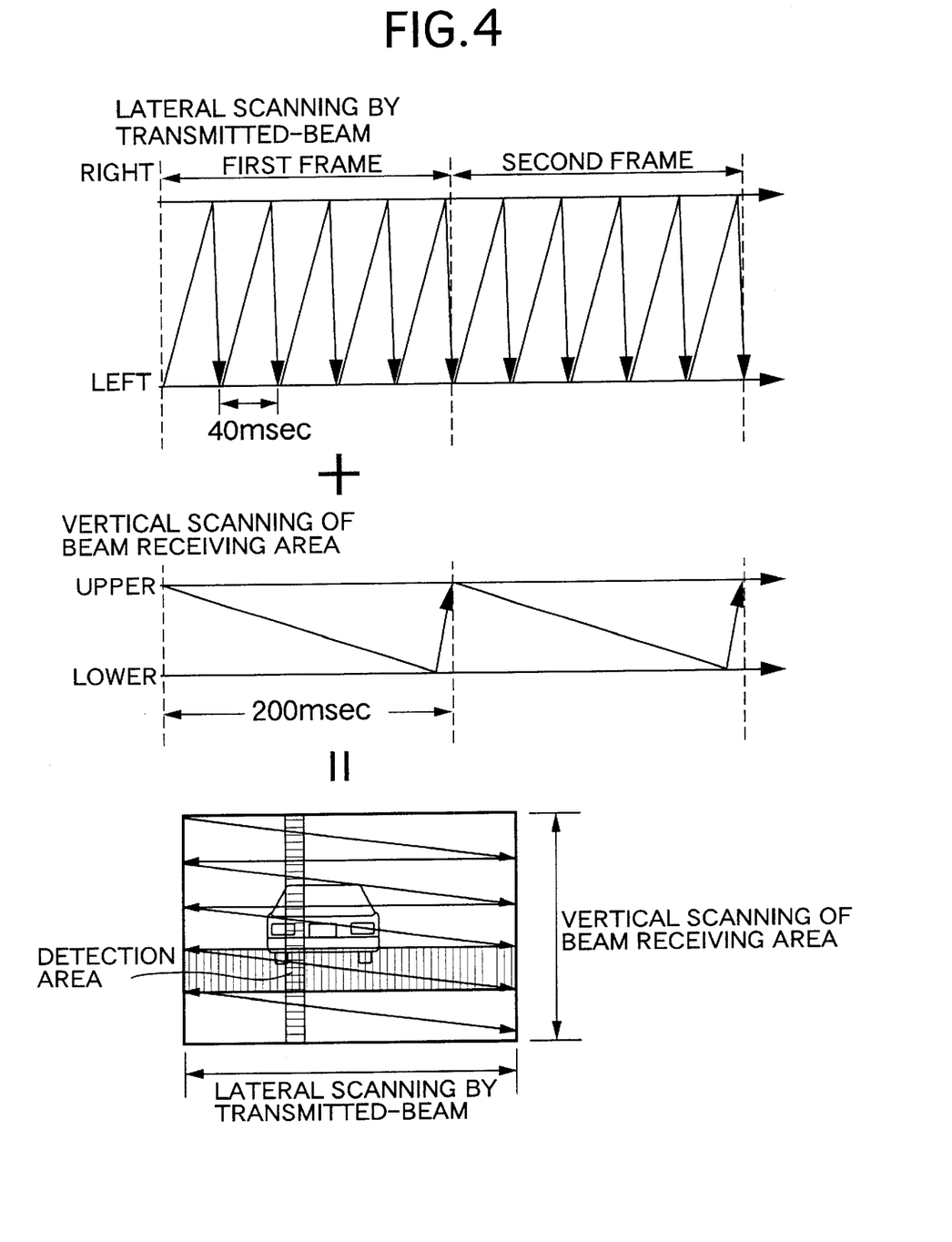
FIG. 4 is an illustration for explaining a pattern of division of a frame.

As shown in FIGS. 3 and 4, the transmitted-beam elongated vertically of the laser radar system is run for scanning laterally at a period of 40 msec, and the beam receiving area elongated laterally of the laser radar system is run for scanning vertically at a period of 200 msec. Thus, an area provided by intersection of the transmitted-beam with the beam receiving area is an instantaneous detection area. The detection area has a lateral width of 16° equal to the width of lateral scanning of the transmitted-beam, and scans the total region of vertically five-divided two-dimensional frames having a vertical width of 10° equal to the width of vertical scanning of the beam receiving area at the period of 200 msec. In this case, the five frames are renewed for 1 sec.

Figure 5:
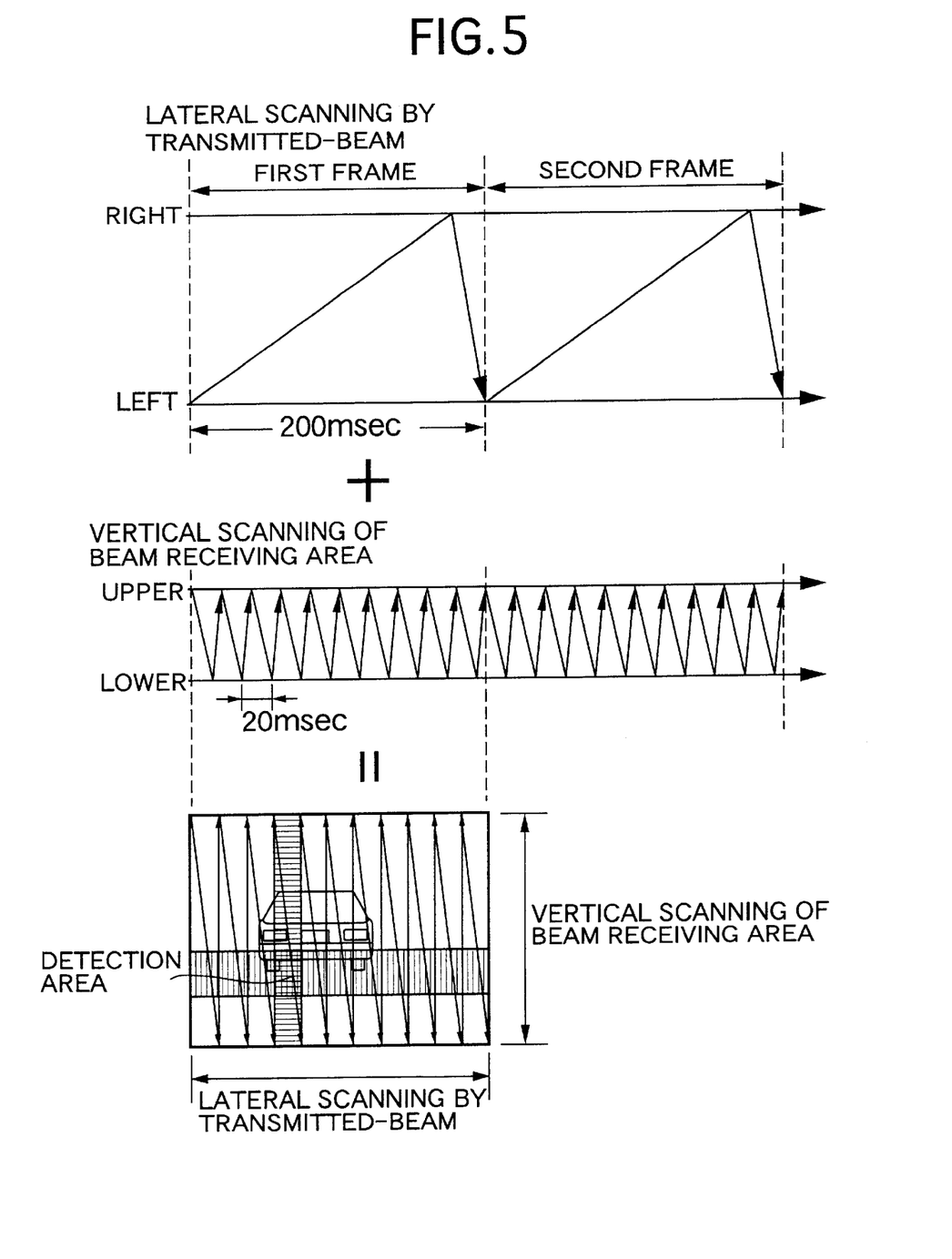
FIG. 5 is an illustration for explaining another pattern of division of the frame.

The scanning pattern of the instantaneous detection area is not limited to that described above, and any other pattern can be established arbitrarily. For example, if the transmitted-beam is run for scanning laterally at a period of 200 msec and the beam receiving area is scanned vertically at a period of 20 msec, as shown in FIG. 5, the instantaneous detection area provided by intersection of the transmitted-beam with the beam receiving area covers the total region of laterally ten-divided two-dimensional frames at the period of 200 msec for scanning. Even in this case, the five frames are renewed for 1 sec.

The vertical angle of the beam receiving area in the laser radar system mounted on the vehicle is sufficient, if it is 4°, but an error on the order of ±3° is anticipated for the vertical accuracy, when the laser radar system is mounted on a vehicle body. Therefore, the following measures (1) and (2) have been employed in the prior art to absorb the error in the mounting of a laser radar system:

(1) The vertical angle of the beam receiving area is set at 4°, and a precise aiming is established, so that the mounting error is not produced in the mounting of the laser radar system on the vehicle body.

(2) An area of 10° (5° each upwards and downwards from the horizontal direction) resulting from addition of ±3° which is an error component to a required beam receiving area of 4° in anticipation of the generation of the mounting error ±3° on the mounting of the laser radar system on the vehicle body, is determined as the beam receiving area.

In the measure (1), a great deal of cost and a lot of time are required, because it is necessary to provide a precise aiming, and also there is the possibility that the detection accuracy could be reduced due to an aiming error. In the measure (2), there is the possibility that the upward maximum angle measured from the horizontal direction could reach 8° (i.e., a sum of 5° which is an upward component of the beam receiving area of 10° and 3° as the error component), and there is much possibility that the direct sun rays may enter the detection area at such times of the day as in the morning or evening when the sun is low, thereby making the detection impossible.

According to the present embodiment, however, the width of vertical scanning of the beam receiving area is set at 10° and hence, ±3° which is the error in the mounting of the laser radar system can be absorbed, and the aiming requiring a great deal of cost and a lot of time can be omitted. Moreover, the vertical scanning of the beam receiving area ensures that the period of time when the direct sun rays enter the detection area to make the detection impossible is a moment, and that the preceding vehicle can be detected reliably, excluding the case where the sun is overlapped on the preceding vehicle. Thus, even at such times of the day as in the morning or evening when the sun is low, the probability that a preceding vehicle cannot be detected can be maintained to the minimum.

FIGS. 6 to 9 show a second embodiment of the present invention.

Figure 6:
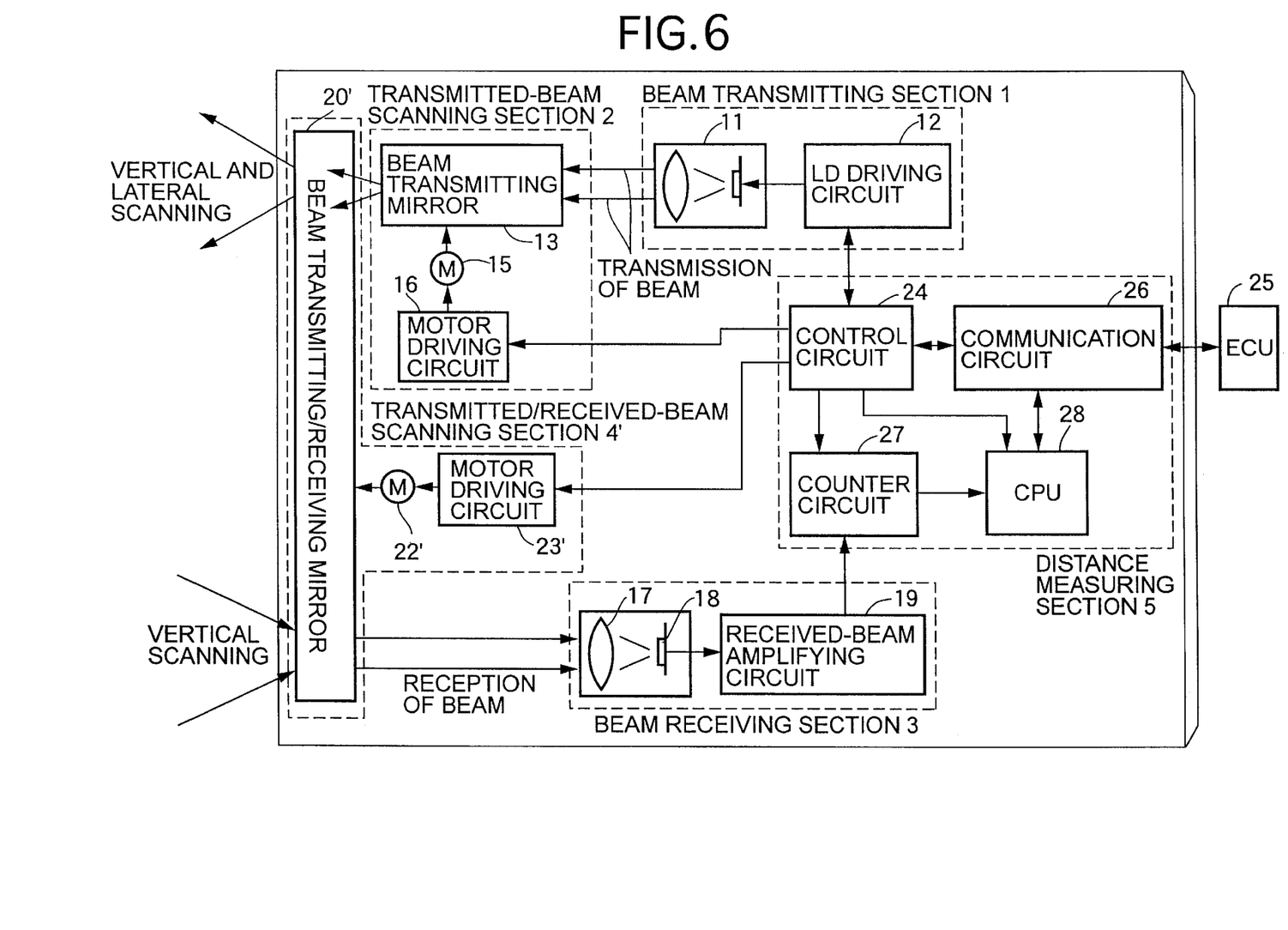
FIG. 6 is a block diagram of a laser radar system according to a second embodiment.
Figure 7:
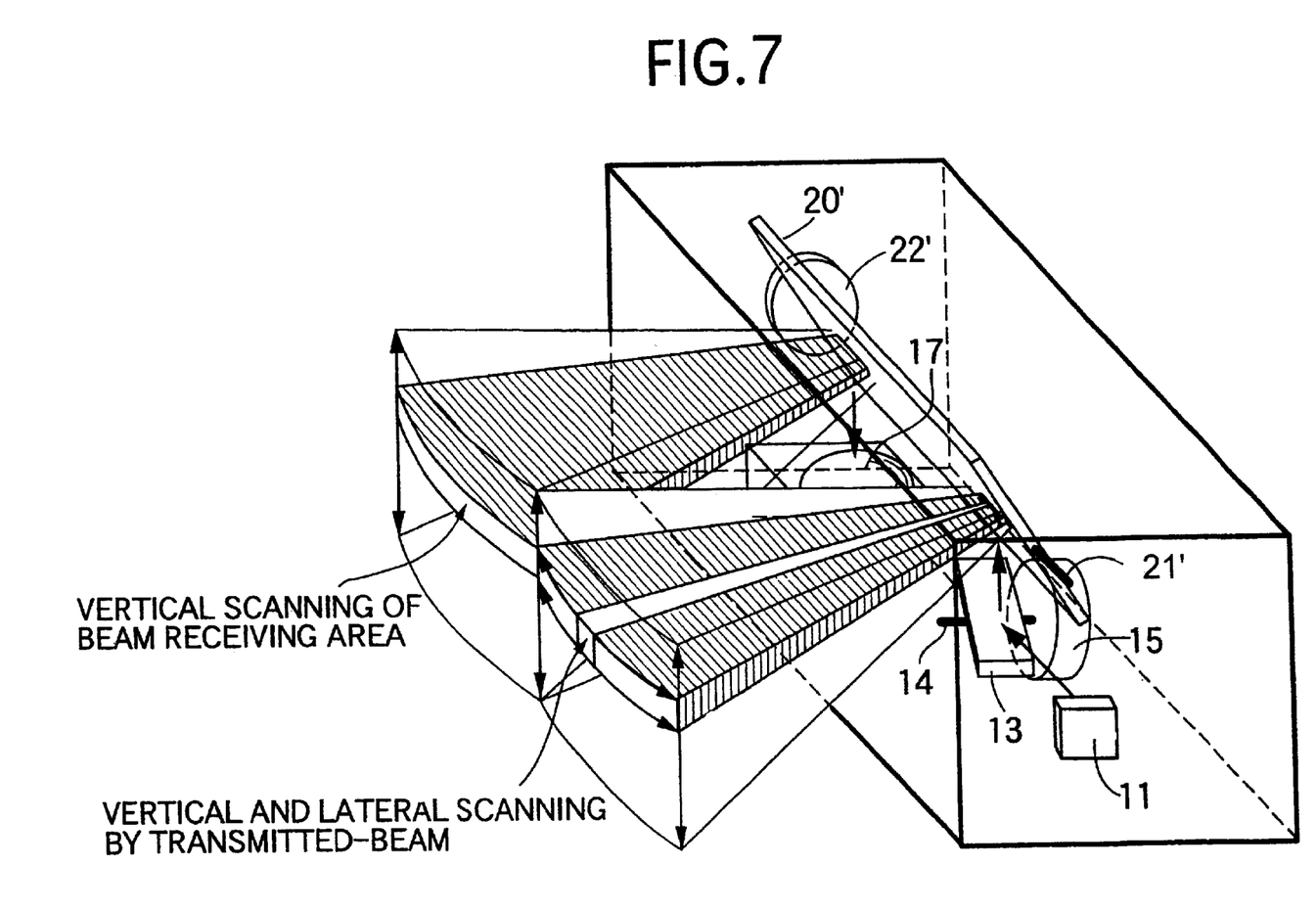
FIG. 7 is a perspective view of the laser radar system according to the second embodiment.
Figure 8:
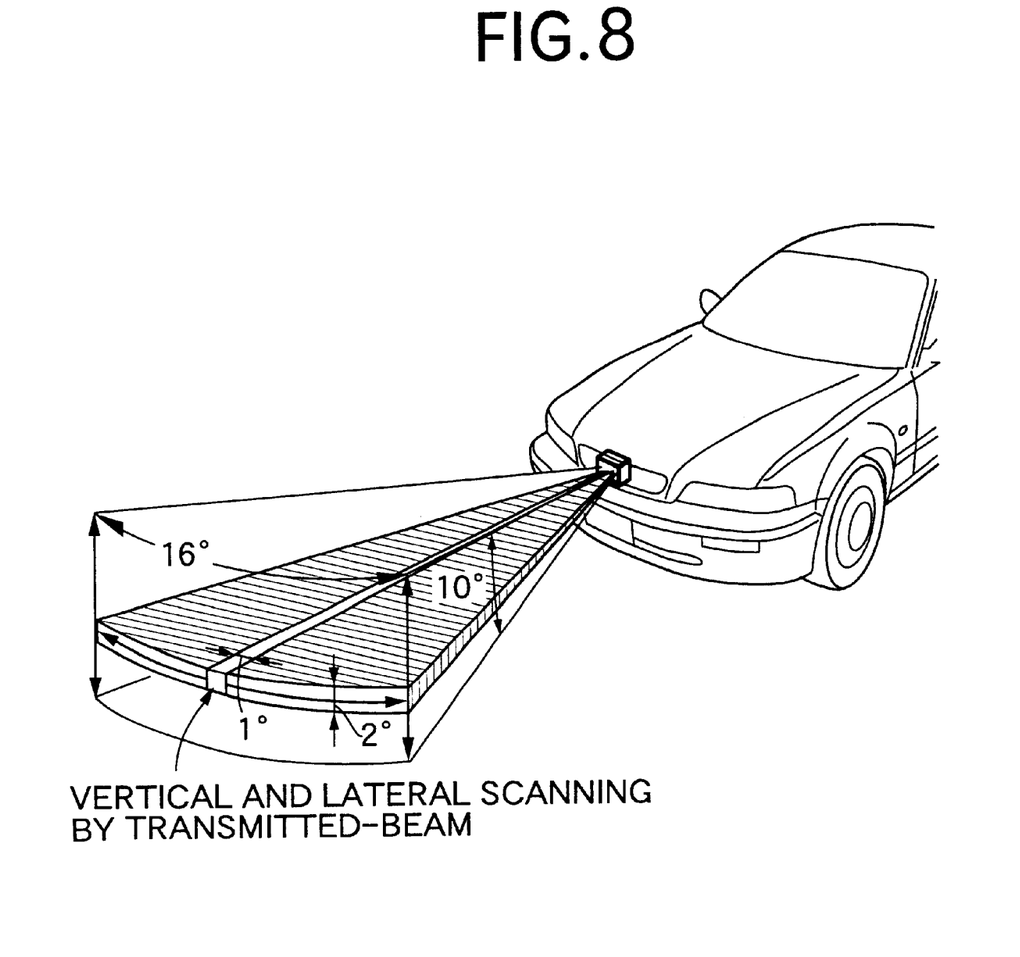
FIG. 8 is an illustration for explaining a scanning way.
Figure 9:
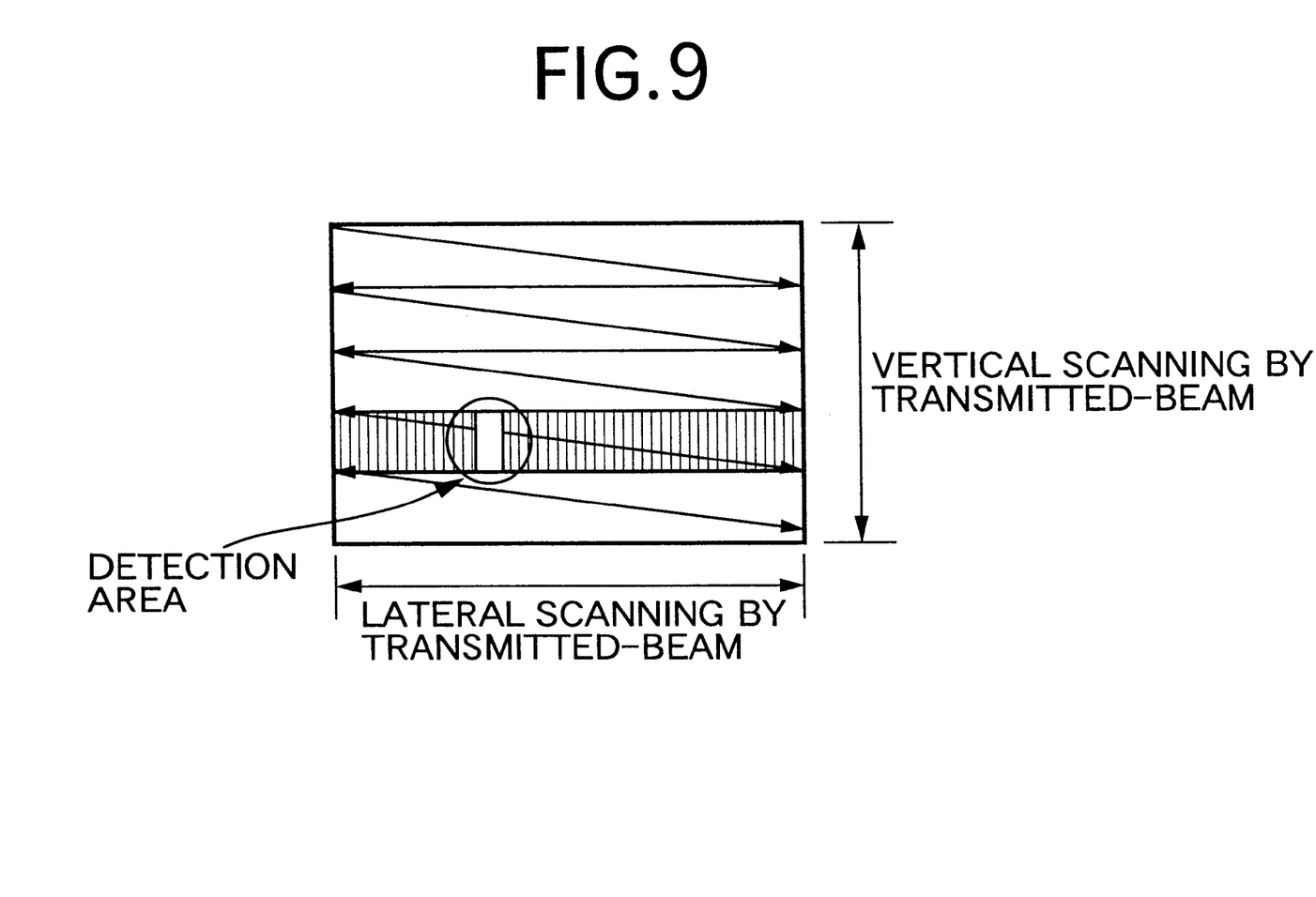
FIG. 9 is an illustration for explaining a pattern of division of a frame.

As apparent from the comparison of the first embodiment shown in FIGS. 1 and 2 with the second embodiment shown in FIGS. 6 and 7, a laser radar system according to the second embodiment includes a transmitted and received-beam scanning section 4' in place of the received-beam scanning section 4 of the laser radar system according to the first embodiment. The transmitted and received-beam scanning section 4' includes a beam transmitting and receiving mirror 20', a motor 22' for reciprocally turning the beam transmitting and receiving mirror 20' about a lateral axis 21', and a motor driving circuit 23' for controlling the driving of the motor 22'.

The transmitted-beam reflected by the beam transmitting mirror 13 is reflected again by the beam transmitting and receiving mirror 20', and the transmitted-beam with the vertical width limited to 2° and the lateral width limited to 1° is run for scanning laterally and vertically. The period of lateral scanning of the transmitted-beam by the reciprocal turning movement of the beam transmitting mirror 13 is of 40 msec, and the period of vertical scanning of the transmitted-beam by the reciprocal turning movement of the beam transmitting and receiving mirror 20' is of 200 msec. By scanning the beam receiving area vertically by the reciprocal turning movement of the beam transmitting and receiving mirror 20', the period of vertical scanning of the beam receiving area is of 200 msec equal to the period of vertical scanning of the transmitted-beam.

Even in this present embodiment, it is possible to maintain, to the minimum, the period of time when the direct sun rays enter the detection area to make the detection impossible, thereby enabling reliable detection of the preceding vehicle, while absorbing ±3° which is the error in the mounting of the laser radar system by setting the width of vertical scanning of the beam receiving area at a large value, i.e., 10°. Moreover, the width of the transmitted-beam assumes a small value as a result of being limited vertically and laterally and hence, the beam density can be increased easily. As a result, the beam emitting power of the laser diode 11 can be reduced, and also the weather resistance at the time of rain, snow or the like can be enhanced if the beam density is increased with the beam emitting power maintained intact.

The beam transmitting section 1 corresponds to an electromagnetic wave transmitting means of the present invention; the transmitted-beam scanning section 2 and the transmitted and received-beam scanning section 4' correspond to a first scanning means of the present invention; the transmitted and received-beam scanning section 4' corresponds to a second Scanning means of the present invention; and the beam receiving section 3 corresponds to a reflected-wave receiving means of the present invention.

Although the embodiments of the present invention have been described, it will be understood that the present invention is not limited to the above-described embodiments, and various modifications in design may be made without departing from the subject matter of the present invention.

For example, the radar system uses the laser beam in the embodiments, but other electromagnetic waves such as a millimeter wave can be used in place of the laser beam.

What is claimed is:

1. A radar system characterized by comprising
    a single electromagnetic wave transmitting means (1) for transmitting an electromagnetic wave,
    a first scanning means (2) for reflectively laterally scanning with the electromagnetic wave transmitted from said electromagnetic wave transmitting means (1) as a single transmitted-beam elongated vertically with a lateral width thereof limited,
    a second scanning means (4) for vertically scanning a receiving area elongated laterally with a vertical width thereof limited to catch the electromagnetic wave reflected from an object, and
    a single reflected-wave receiving means (3) for receiving the single reflected wave caught in said receiving area.

2. The radar system of claim 1, wherein said transmitted-beam has a vertical dimension substantially identical to a vertical dimension of a scanned area of said object, and said reflected wave has a lateral width substantially identical to a lateral width of said receiving area.

3. The radar system of claim 1, wherein said transmitted-beam has a lateral dimension substantially identical to the vertical dimension of said reflected wave,
    and said receiving area being elongated laterally with a vertical width thereof limited constantly during said vertical scanning.

4. A radar system characterized by comprising
    an electromagnetic wave transmitting means (1) for transmitting an electromagnetic wave,
    a first scanning means (2, 4') for vertically and laterally scanning with the electromagnetic wave transmitted from said electromagnetic wave transmitting means (1) as a transmitted-beam having limited lateral and vertical widths thereof,
    a second scanning means (4') for vertically scanning a receiving area, said receiving area being elongated laterally with a vertical width thereof limited constantly during said scanning, to catch said electromagnetic wave reflected from an object, and a reflected-wave receiving means (3) for receiving said reflected wave caught in said receiving area, wherein a period of scanning by said second scanning means (4') is equal to a period of vertical scanning by said first scanning means (2, 4').

5. A radar system characterized by comprising:

a single electromagnetic wave transmitting means (1) for transmitting an electromagnetic wave;

a first scanning means (2, 4') for vertically and laterally scanning with the electromagnetic wave transmitted from said electromagnetic wave transmitting means (1) as a transmitted-beam having limited lateral and vertical widths thereof;

a second scanning means (4') for vertically scanning a receiving area elongated laterally with a vertical width thereof limited constantly during said vertical scanning, to catch said electromagnetic wave reflected from an object; and a single reflected-wave receiving means (3) for receiving said reflected wave caught in said receiving area;

wherein a period of scanning by said second scanning means (4') is equal to a period of vertical scanning by said first scanning means (2, 4').

* * * * *